(12) United States Patent
Mochizuki

(10) Patent No.: US 7,881,588 B2
(45) Date of Patent: Feb. 1, 2011

(54) IMAGE REPRODUCING APPARATUS

(75) Inventor: Shigeki Mochizuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1266 days.

(21) Appl. No.: 11/453,630

(22) Filed: Jun. 15, 2006

(65) Prior Publication Data

US 2007/0003256 A1   Jan. 4, 2007

(30) Foreign Application Priority Data

Jun. 30, 2005   (JP)   ............................ 2005-192566

(51) Int. Cl.
| | |
|---|---|
| H04N 9/88 | (2006.01) |
| H04N 5/63 | (2006.01) |
| H04N 5/94 | (2006.01) |
| H04N 11/20 | (2006.01) |
| H04B 1/00 | (2006.01) |
| H04L 1/18 | (2006.01) |
| H04L 27/06 | (2006.01) |
| G06K 9/46 | (2006.01) |
| G11B 5/02 | (2006.01) |

(52) U.S. Cl. ........................ 386/263; 386/264; 386/270; 386/271; 386/353; 348/441; 348/453; 360/18; 375/147; 375/340; 382/232; 382/239; 714/751

(58) Field of Classification Search ................. 386/112, 386/47, 51, 113, E5.015, E5.028, E5.035, 386/E5.036, E5.052; 348/441, 453, E9.042; 360/18; 370/329, 465; 375/147, 340; 714/751; 715/751

See application file for complete search history.

(56) References Cited

U.S. PATENT DOCUMENTS

| | | | | | |
|---|---|---|---|---|---|
| 5,481,412 | A | * | 1/1996 | Bannai et al. | 360/18 |
| 6,061,494 | A | * | 5/2000 | Kikuchi | 386/47 |
| 6,263,107 | B1 | * | 7/2001 | Ikeda et al. | 382/232 |
| 6,909,758 | B2 | * | 6/2005 | Ramesh et al. | 375/340 |
| 7,477,302 | B2 | * | 1/2009 | Hisamatsu et al. | 348/243 |
| 2002/0191104 | A1 | * | 12/2002 | Matsutani et al. | 348/441 |

FOREIGN PATENT DOCUMENTS

| | | | |
|---|---|---|---|
| JP | 11355720 A | * | 12/1999 |
| JP | 411355720 A | * | 12/1999 |

* cited by examiner

*Primary Examiner*—Thai Tran
*Assistant Examiner*—Syed Y Hasan
(74) *Attorney, Agent, or Firm*—Cowan, Liebowitz & Latman, P.C.

(57) ABSTRACT

A reproducing apparatus includes: a reproducing unit for reproducing, from a recording medium on which main image for normal reproduction data and specific reproduction image data made up of a plurality of blocks each including first data and second data are recorded, the main image data and the specific reproduction image data; a detecting unit for detecting an error in the first data and an error in the second data in the respective blocks of the specific reproduction image data that is reproduced by the reproducing unit, independently; and an interpolation processing unit for interpolating independently the first data and the second data in which the error is detected by the detecting unit, by selectively using a plurality of interpolating methods.

4 Claims, 8 Drawing Sheets

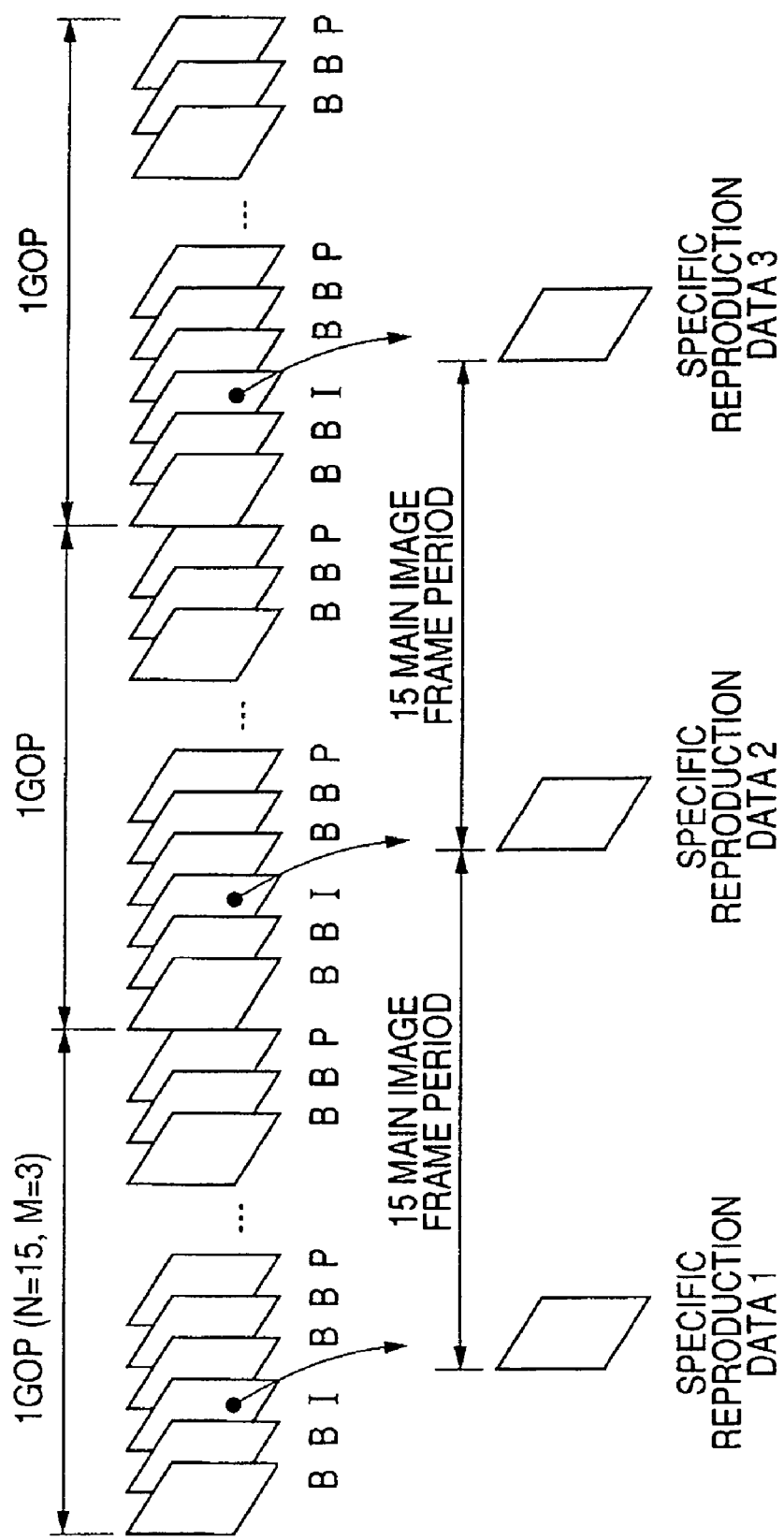

FIG. 3A  CASE OF PACKET DROPOUT OF LUMINANCE SIGNAL Y0 AND COLOR DIFFERENCE SIGNALS Cb AND Cr

FIG. 3B  CASE OF PACKET DROPOUT OF LUMINANCE SIGNALS Y1, Y2 AND Y3

DROPOUT LUMINANCE/COLOR DIFFERENCE VALUES

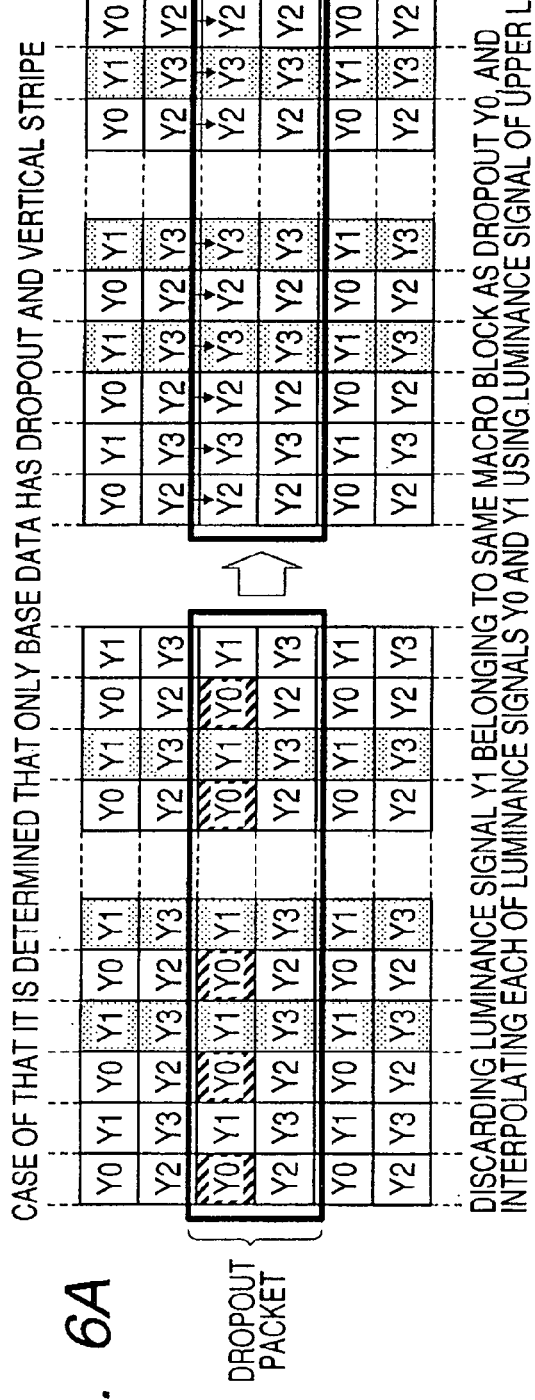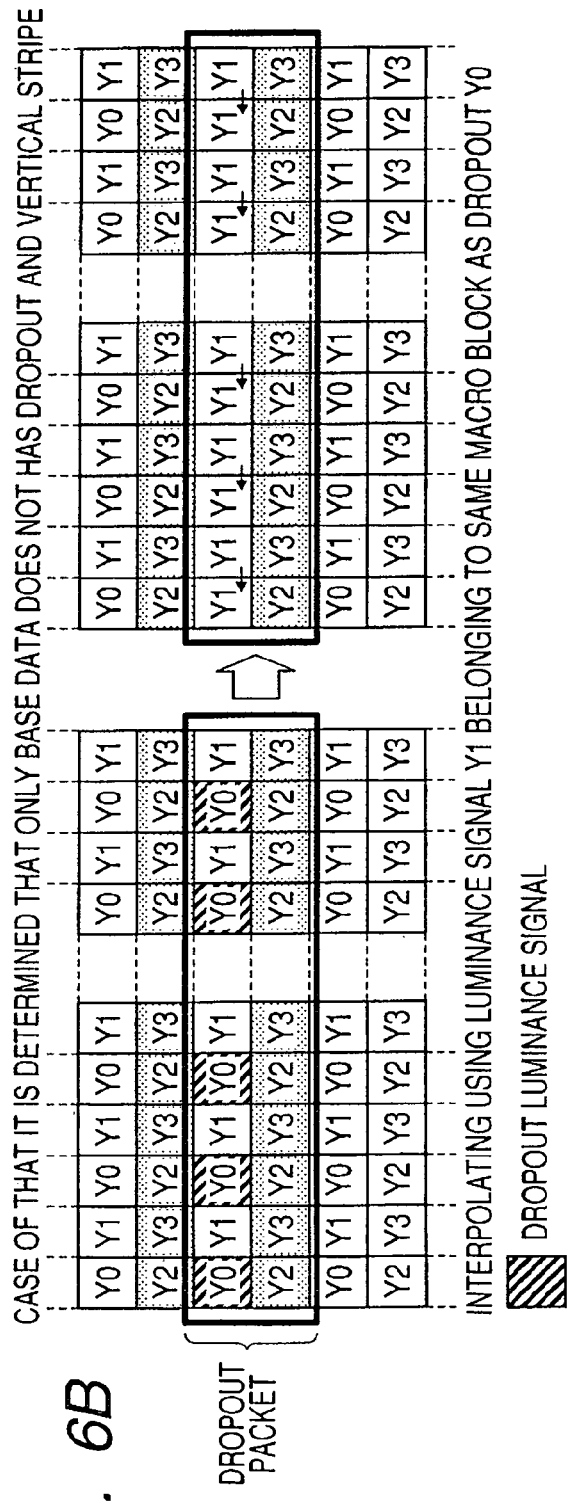
FIG. 6A
FIG. 6B

FIG. 7A

CASE OF THAT IT IS DETERMINED THAT ONLY HELPER DATA HAS DROPOUT AND VERTICAL STRIPE

DISCARDING LUMINANCE SIGNAL Y0 BELONGING TO SAME MACRO BLOCK AS DROPOUT Y1, INTERPOLATING EACH OF LUMINANCE SIGNALS Y0 AND Y1 USING LUMINANCE SIGNAL OF UPPER LINE, AND INTERPOLATING DROPOUT LUMINANCE SIGNALS Y2 AND Y3 USING LUMINANCE SIGNAL OF UPPER LINE

FIG. 7B

CASE OF THAT IT IS DETERMINED THAT ONLY HELPER DATA DOES NOT HAVE DROPOUT AND VERTICAL STRIPE

INTERPOLATING DROPOUT Y1 USING LUMINANCE SIGNAL Y0 BELONGING TO SAME MACRO BLOCK AS DROPOUT Y1, AND INTERPOLATING DROPOUT LUMINANCE SIGNALS Y2 AND Y3 USING LUMINANCE SIGNAL OF UPPER LINE

▨ DROPOUT LUMINANCE SIGNAL

IMAGE REPRODUCING APPARATUS

BACKGROUND OF THE INVENTION

1. Field of the Invention

The present invention relates to a reproducing apparatus and a reproducing method, and more particularly, to an interpolating technique related to a specific reproduction image.

2. Related Background Art

There is known a digital VTR for encoding an image signal and recording and reproducing the encoded image signal on and from a magnetic tape. Also, there is known a VTR that produces high-speed reproduction (specific reproduction) data such as search reproduction in addition to a normal reproduction image signal that is subjected to moving picture experts group (MPEG) encoding to record image data in a predetermined area on a magnetic tape.

As an example, a description will be given in which an image signal of 1440×1080i is encoded, and recorded on the magnetic tape. The effective pixels of the image signal to be encoded are 1440 samples in the horizontal direction and 1080 lines in the vertical direction with respect to a luminance signal Y, and 720 samples in the horizontal direction and 540 lines in the vertical direction with respect to color difference signals Cb and Cr, respectively.

The signal is divided into macro blocks (MB) to provide 90 macro blocks in the horizontal direction and 68 macro blocks in the vertical direction as shown in FIG. 1, and encoded. The macro blocks of the luminance signal is made up of four DCT blocks, and each of the color difference signals Cr and Cb includes macro blocks each of which is made up of one DCT block. Also, a DC component is extracted from the DCT block of an I picture that is made up of an intra frame, thereby producing specific reproduction data (for example, refer to Japanese Patent Application Laid-Open No. 2001-298706).

In this situation, the data of the extracted DC component is converted into 6 bits with respect to the luminance signal Y and converted into 5 bits with respect to the color difference signals Cb and Cr, respectively. As a result, the specific reproduction data can be produced with a fixed length of (6×4+5× 2)=34 bits per one macro block and (90×68×34)=208080 bits per one frame.

Also, the specific reproduction data is reproduced from the I picture. For example, when one group of pictures (GOP) is made up of 15 frames and B pictures arranged between an I-P picture and a P-P picture are made up of 3 frames, as shown in FIG. 2, the I picture is encoded every 15 frames, so the specific reproduction image is produced every 15 main image frames.

Also, as shown in Japanese Patent Application Laid-Open No. 2002-209179, there is proposed an information recording device using a method in which the above-mentioned specific reproduction data is divided into a group of luminance signal Y0 and color difference signals Cb and Cr, and a group of luminance signals Y1, Y2, and Y3 in the macro block, the respective groups are packetized with fixed lengths, and thereafter those packet signals are subjected to an error correction encoding process and recorded on the magnetic tape, independently, thereby making it possible to readily and roughly display an entire screen even in the case where there is dropout specific reproduction data.

FIGS. 3A and 3B show dropouts of respective packets in the case where the specific reproduction data is divided into a group of luminance signal Y0 and color difference signals Cb and Cr, and a group of luminance signals Y1, Y2, and Y3 in the macro block, the respective groups are packetized with fixed lengths, and thereafter those packet signals are subjected to an error correction encoding process and recorded. FIG. 3A shows a case of packet dropout of luminance signal Y0 and color difference signals Cb and Cr. FIG. 3B shows a case of packet dropout of luminance signals Y1, Y2, and Y3.

As described above, the specific reproduction data is divided into the group of the luminance signal Y0 and the color difference signals Cb and Cr, and the group of the luminance signals Y1, Y2, and Y3 in the macro block, and those signals are subjected to the error correction encoding process and recorded, independently. At the time of reproduction, when there exists an error in the reproduction data due to some factor and there occurs dropout of specific reproduction data, the luminance data Y0 and the luminance data Y1, Y2, and Y3 in the macro block drop out, individually.

The respective dropout luminance data corresponds to an area of 8×8 pixels in the reproduction image. Therefore, in the case where the dropout area is interpolated by an image of another block within the same frame, there is the possibility that an asperity pattern is highly visible in the reproduced image.

Also, as the interpolating method, there has been proposed the use of image data of a frame that has already been reproduced. However, because the specific reproduction data is produced from the I picture, it is general that the specific reproduced image is produced every plural frames of the main image. For example, as shown in FIG. 2, in the case where the one GOP is made up of 15 frames, an image before one frame in the specific reproduction data corresponds to an image before 15 frames in terms of the normal reproduction main image. For that reason, in the case where the dropout data is interpolated by using the image data of the frame that has been reproduced immediately before the subject frame, a difference from the surrounding blocks becomes large, and the interpolation block is highly visible.

In this way, there has been required an interpolating method that takes dropout of the specific reproduction data on the packet base into consideration.

SUMMARY OF THE INVENTION

An aspect of the present invention is to solve the above-mentioned problems.

Another aspect of the present invention is to obtain an excellent specific reproduction image by interpolating the dropout specific reproduction data even if the specific reproduction data has dropout at the time of reproduction.

In order to solve the problems, according to an aspect of the present invention, a reproducing apparatus comprises: reproducing means for reproducing, from a recording medium on which encoded normal reproduction main image data and specific reproduction image data made up of a plurality of blocks each including first data and second data are recorded, the main image data and the specific reproduction image data; detecting means for detecting an error in the first data and an error in the second data in the respective blocks of the specific reproduction image data that is reproduced by the reproducing means, independently; and interpolation processing means for interpolating independently the first data and the second data in which the error is detected by the detecting means, by selectively using a plurality of interpolating methods.

BRIEF DESCRIPTION OF THE DRAWINGS

FIG. 2 is a diagram for explaining a time interval at which a specific reproduction image is produced;

FIGS. 3A and 3B are diagrams each showing a state in which specific reproduction data has dropout on a packet basis;

FIGS. 6A and 6B are diagrams for explaining the interpolating process in the case where base data has dropout;

FIGS. 7A and 7B are diagrams for explaining the interpolating process in the case where helper data has dropout.

DESCRIPTION OF THE PREFERRED EMBODIMENTS

Now, a description will be given in detail of exemplary embodiments of the present invention with reference to the accompanying drawings.

Figure 1:
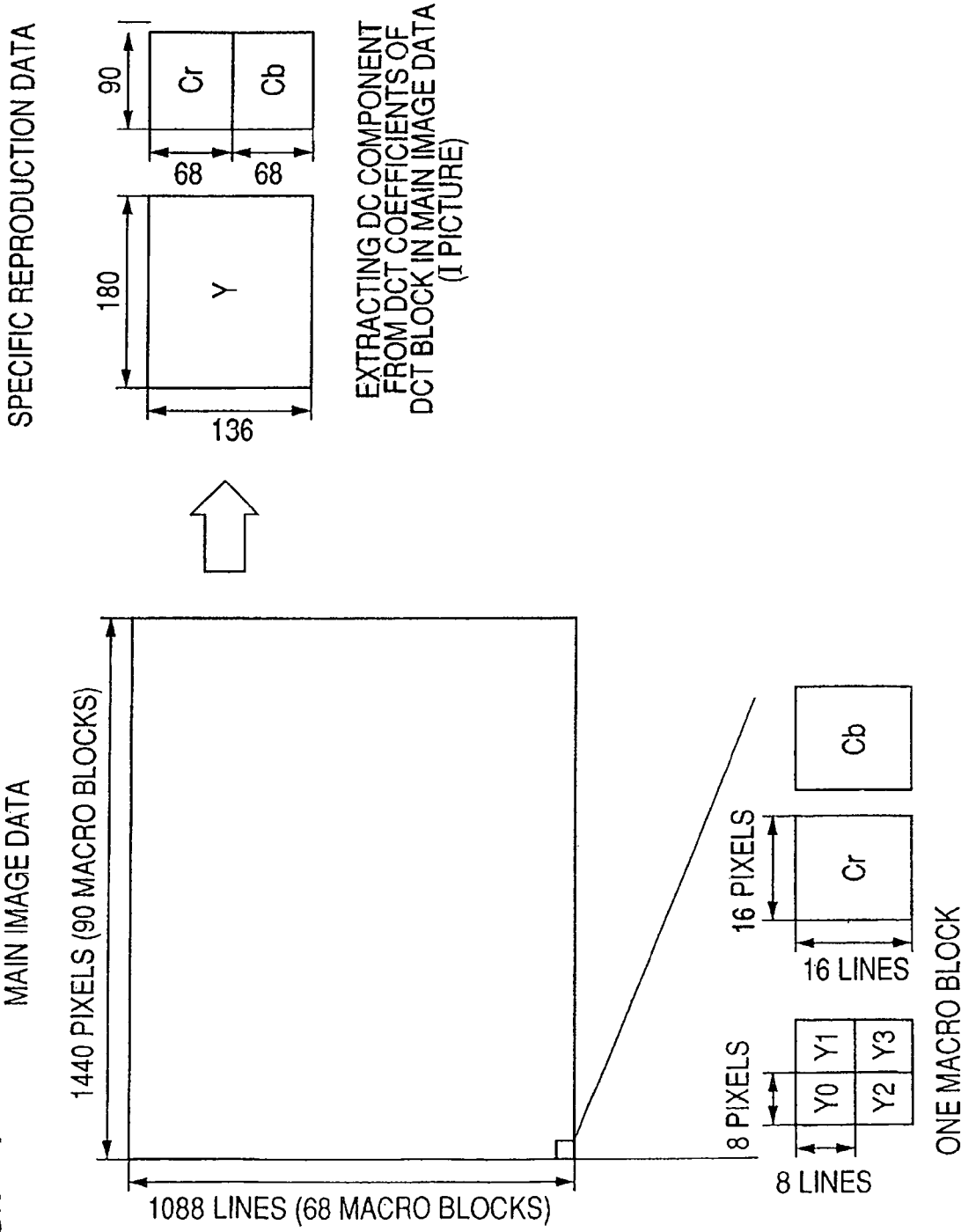
FIG. 1 is a diagram showing a relationship in the resolution between a normal reproduction main image and a specific reproduction image.
Figure 4:
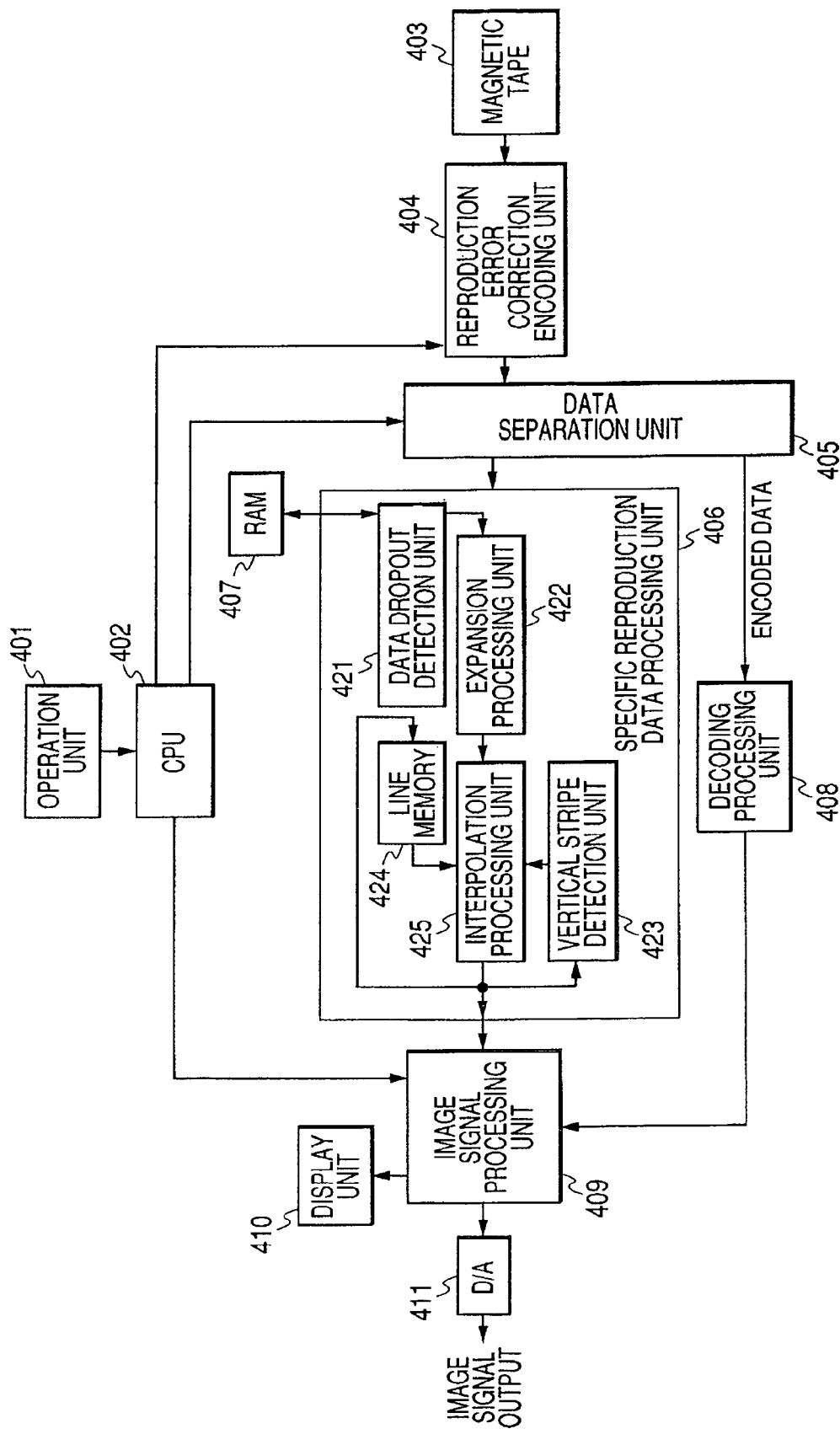
FIG. 4 is a block diagram showing a structural example of a reproducing apparatus according to an embodiment of the present invention.

FIG. 4 is a block diagram showing a structural example of a magnetic tape reproducing apparatus to which a reproducing apparatus according to an embodiment of the present invention is applied.

In this embodiment, a description will be given of an apparatus that reproduces a magnetic tape for which an image signal of 1440×1080i is encoded through the MPEG system, and encoded normal reproduction main image data and encoded specific reproduction data which have been recorded on the magnetic tape.

The specific reproduction data is produced by extracting a DC component that is a low frequency component, from a DCT block within the I picture of the normal reproduction main image as described above. In addition, in the specific reproduction data, luminance signals are separated, and a luminance signal Y0 and color difference signals Cb and Cr (hereinafter collectively called "base data"), as well as luminance signals Y1, Y2, and Y3 (hereinafter collectively called "helper data") are packetized, individually. Thereafter, those packetized signals are subjected to an error correction encoding process, independently, and recorded.

Referring to FIG. 4, a CPU 402 controls respective functional units that constitute the magnetic tape reproducing apparatus of this embodiment on the basis of signals that are transmitted from an operation unit 401 according to operation by a user. A reproduction/error correction encoding unit 404 reads data from a magnetic tape 403 under the control from the CPU 402, subjects the read data to an error correction decoding process, and outputs the resultant data to a data separation unit 405. The data separation unit 405 selects the specific reproduction data or the normal reproduction data (main image data) from the supplied reproduced data, outputs the specific reproduction data to a specific reproduction data processing unit 406, and outputs the normal reproduction data to a decoding processing unit 408.

The specific reproduction data processing unit 406 conducts expansion processing on the specific reproduction data that has been read out from the magnetic tape 403 at the time of specific reproduction. Also, the decoding processing unit 408 decodes the encoded normal reproduction main image data which has been read out from the magnetic tape 403 at the time of normal reproduction. An image signal processing unit 409 displays the reproduced image that has been obtained by the specific reproduction data processing unit 406 or the decoding processing unit 408 on a display unit 410, and outputs the reproduced image to an external device through a digital to analog (D/A) conversion unit 411.

Upon receiving an instruction of normal reproduction from the operating unit 401, the CPU 402 controls the reproduction/error correction encoding unit 404, and reproduces the data from the magnetic tape 403. The reproduction/error correction encoding unit 404 subjects the reproduced data to the error correction decoding process, and thereafter outputs the data to the data separation unit 405.

The data separation unit 405 selects the normal reproduction data (main image data) from the reproduction data, and outputs the selected data to the decoding processing unit 408. The decoding processing unit 408 decodes the normal reproduction data and outputs the decoded data to the image signal processing unit 409. The image signal processing unit 409 displays the decoded image signal on the display unit 410, converts the decoded image signal into an analog image signal through the D/A conversion unit 411, and outputs the converted analog image signal into the external device.

On the other hand, upon receiving an instruction of search reproduction from the operating unit 401, the CPU 402 controls the reproduction/error correction encoding unit 404, and reproduces the search reproduction data from the magnetic tape 403 while transporting the magnetic tape 403 at a given speed that is higher than that at the time of the normal reproduction. The reproduced data that has been read out from the magnetic tape 403 is subjected to error correction processing by the reproduction/error correction encoding unit 404, and thereafter only the reproduced data that has been normally acquired is supplied to the data separation unit 405.

The data separation unit 405 separates only the specific reproduction data from the inputted reproduced data, adds update information indicating that the data has been normally updated to the separated specific reproduction data, and supplies the data to the specific reproduction data processing unit 406. The specific reproduction data that is supplied from the data separation unit 405 is stored in a RAM 407 by the specific reproduction data processing unit 406, and the specific reproduction data that is sequentially acquired is stored in the RAM 407. The specific reproduction data processing unit 406 conducts expansion processing at a stage where the specific reproduction data for one frame has been acquired.

In this example, there is a case in which some of the specific reproduction data for one frame of the specific reproduction image do not exist in the case where a reproduction error occurs from the magnetic tape 403, or in the case where data is half-way recorded on the magnetic tape 403. The specific reproduction data processing unit 406 has a function of interpolating the dropout data in the case there occurs the dropout of data.

The specific reproduction data processing unit 406 includes a data dropout detection unit 421, an expansion processing unit 422, a vertical stripe detection unit 423, a line memory 424, and an interpolation processing unit 425.

The data dropout detection unit 421 determines whether the specific reproduction data that is stored in the RAM 407 is a specific reproduction data packet that has been written in advance, or a specific reproduction data packet that has been newly written on the basis of the update information that has been added by the data separation unit 405. Then, the data dropout detection unit 421 detects the dropout of data. The expansion processing unit 422 converts the specific reproduction data into an image signal.

The vertical stripe detection unit 423 compares the luminance values of adjacent pixels in a line that is being subjected to expansion processing, with each other, and stores pixel positions on the line in the case where a difference between the luminance values is equal to or higher than a given value. Then, the vertical stripe detection unit 423 further compares the luminance value of the stored pixel position with a luminance value of the same pixel position in another line to be subsequently processed and judges that a vertical stripe is detected, in the case where an approximate level continues for given lines or more. In other words, the vertical stripe detection unit 423 detects a vertical stripe pattern as one feature of the specific reproduction image.

The line memory 424 is so designed as to hold the extended specific reproduction data for one line. Also, the interpolation processing unit 425 replaces the specific reproduction data that has dropped out due to an error, with data around the dropout data on the basis of the detection results from the data dropout detection unit 421 and the vertical stripe detection unit 423. To be more specific, the error data is replaced with data of pixels adjacent to each other in the horizontal direction or in the vertical direction.

Figure 5:
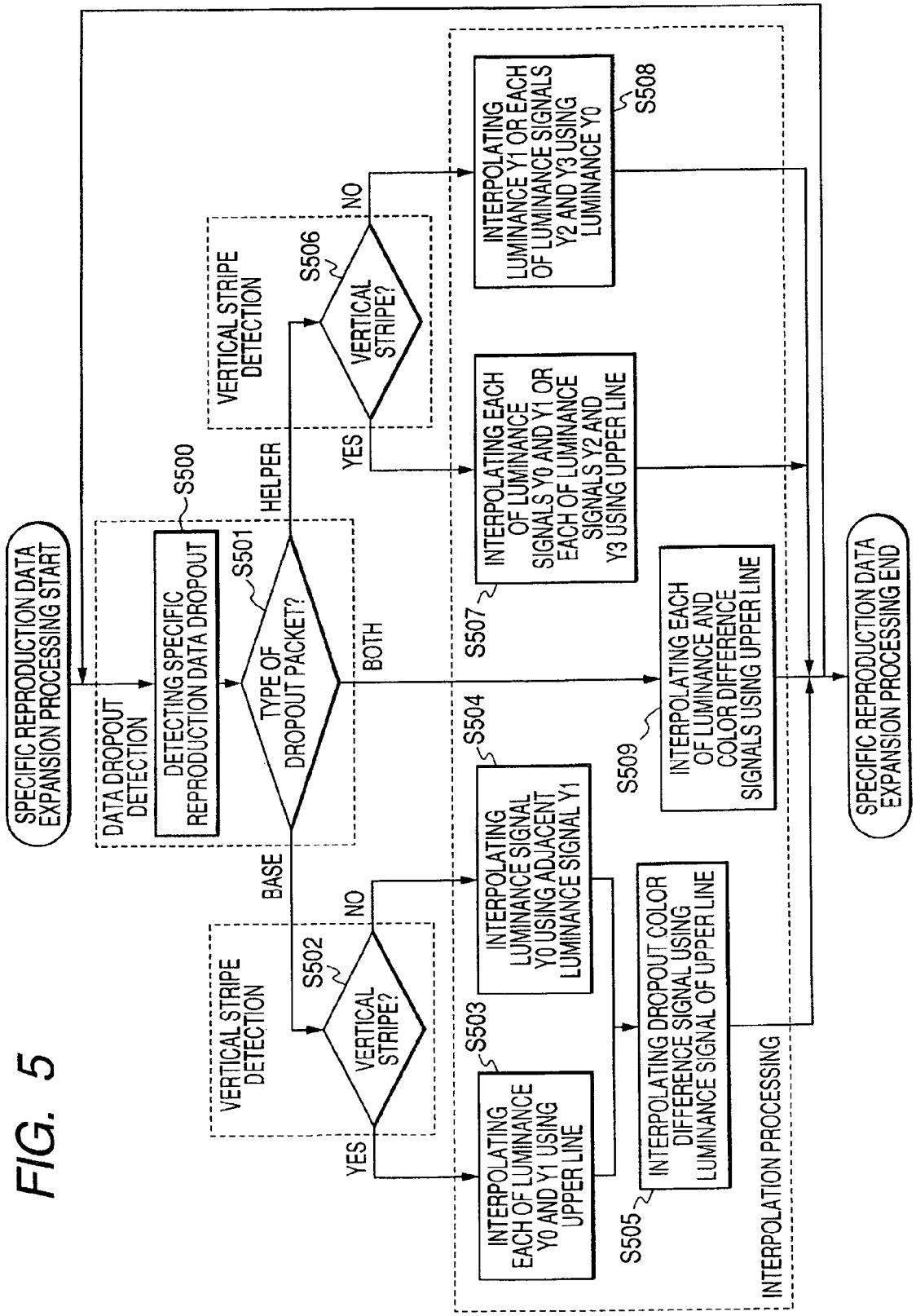
FIG. 5 is a flowchart showing an interpolating operation of the specific reproduction data.

FIG. 5 is a flowchart showing the interpolation processing operation of the specific reproduction data in this embodiment. Hereinafter, a description will be given of the interpolation processing that is conducted by the specific reproduction data processing unit 406 with reference to FIG. 5.

Upon detection of the dropout data, the data dropout detection unit 421 determines whether any one or both of the base data and the helper data have dropout or not, that is, which data has dropout of the packet (Steps S500, S501).

As a result, in the case where only the base data has dropout, the luminance signal Y0 and the color difference signals Cb and Cr have dropout in the macro block of the specific reproduction data as shown in FIG. 3A.

In this situation, in the case where it is determined that the dropout luminance signal Y0 corresponds to a vertical strip, through the vertical stripe detection unit 423 (yes in Step S502), the interpolation processing unit 425 discards the luminance signal Y1 of the same macro block as that of the dropout luminance signal Y0. Then, the interpolation processing unit 425 replaces the luminance signals Y0 and Y1 with the luminance signals on a line immediately before the subject line which has been stored in the line memory 424, respectively (Step S503) (refer to FIG. 6A).

On the other hand, in the case where it is determined that the dropout luminance signal Y0 does not correspond to a vertical strip through the vertical stripe detection unit 423 (no in Step S502), the interpolation processing unit 425 replaces the droplet luminance signal Y0 with the adjacent luminance signal Y1 (Step S504) (refer to FIG. 6B). In addition, the interpolation processing unit 425 replaces the dropout color difference signals Cb and Cr with the color difference signals on the line immediately before the subject line, which has been stored in the line memory 424 (step S505).

Subsequently, in the case where only the helper data has dropout as a result of the determination in Step 501, the luminance signals Y1, Y2, and Y3 have dropout in the macro block of the specific reproduction data as shown in FIG. 3B, and the color difference signals Cb and Cr are normal.

In this situation, in the case where it is determined by the vertical stripe detection unit 423 that the luminance signals Y1, Y2, and Y3 correspond to have vertical stripes (yes in Step S506), the interpolation processing unit 425 interpolates the luminance signals Y1, Y2, and Y3 by using the luminance signals on a line immediately before the subject line, which has been stored in the line memory 424 (Step S507). To be more specific, the interpolation processing unit 425 discards the luminance signal Y0 in the same macro block as that of the dropout luminance signal Y1, and replaces the luminance signals Y0 and Y1 with the luminance signals on a line immediately before the subject line, which has been stored in the line memory 424, respectively. Also, the interpolation processing unit 425 replaces the luminance signals Y2 and Y3 with the luminance signals on a line immediately before the subject line, which has been stored in the line memory 424 (refer to FIG. 7A).

On the other hand, in the case where it is determined by the vertical stripe detection unit 423 that the luminance signals Y1, Y2, and Y3 do not correspond to vertical stripes (no in Step S506), the interpolation processing unit 425 replaces the dropout luminance signal Y1 with the adjacent luminance signal Y0. Also, the interpolation processing unit 425 replaces the luminance signals Y2 and Y3 with the luminance signals on a line immediately before the subject line, which has been stored in the line memory 424 (Step S508) (refer to FIG. 7B).

Subsequently, in the case where both of the base data and the helper data have dropout as a result of the determination in Step 501, there occurs dropout of all of the luminance signals Y0 to Y3 and the color difference signals Cb and Cr. Therefore, the interpolation processing unit 425 replaces all of the dropout luminance signals and color difference signals with data on a line immediately before the subject line, which have been stored in the line memory 424 (Step S509) (refer to FIG. 8).

The above-mentioned interpolation processing is subjected to all of the lines, thereby obtaining a specific reproduction image that has been subjected to interpolation processing with respect to one frame of the specific reproduction data.

The specific reproduction image that has been subjected to expansion processing by the specific reproduction data processing unit 406 is supplied to the image signal processing unit 409, the image size is converted into a display size of the display unit 410 by the image signal processing unit 409, and the converted image is outputted to the display unit 411. As a result, the specific reproduction image is displayed on the display unit 411.

Also, the specific reproduction image that has been supplied to the image signal processing unit 409 is supplied to the D/A unit 411 from the image signal processing unit 409, converted into the analog image signal by the D/A unit 411, and thereafter outputted as a video signal.

FIGS. 6A to 8 are diagrams showing the above-mentioned interpolation processing.

The interpolation processing shown in FIGS. 6A to 8 is appropriately conducted according to the error status, thereby obtaining the specific reproduction image that has been subjected to the interpolation processing with respect to one frame of the specific reproduction data. In FIGS. 6A to 8, only the luminance signals are shown, and the color difference signals are omitted.

FIGS. 6A and 6B shows the interpolation processing in the case where only the base data has dropout. As shown in FIG. 6A, in the case where it is determined that the base data has a vertical stripe, the luminance signal Y1 in the same macro block as that of the dropout luminance signal Y0 is discarded, and the dropout luminance signals Y0 and Y1 are interpolated by the luminance signals Y2 and Y3 on a line immediately before the subject line, respectively. Also, in the case where it is determined that the base data does not have the vertical stripe, the dropout luminance signal Y0 is interpolated by the adjacent luminance signal Y1 (the luminance signal Y1 in the same macro block).

FIGS. 7A and 7B show the interpolation processing in the case where only the helper data has dropout.

As shown in FIG. 7A, in the case where it is determined that the helper data corresponds to the vertical stripe, the luminance signal Y0 in the same macro block as that of the dropout luminance signal Y1 is discarded, and the dropout luminance signals Y0 and Y1 are interpolated by the luminance signals Y2 and Y3 on a line immediately before the subject line, respectively. Further, the dropout luminance signals Y2 and Y3 are interpolated by the luminance signals on the upper line, that is, the luminance signals Y2 and Y3 on an upper line used for interpolating the luminance signals Y0 and Y1 in the same macro block, respectively.

Also, as shown in FIG. 7B, in the case where it is determined that the helper data does not correspond to the vertical stripe, the dropout luminance signal Y1 is interpolated by the luminance signal Y0 in the same macro block. Further, the dropout luminance signals Y2 and Y3 are interpolated by luminance signals on the upper line, respectively. Accordingly, in the case where it is determined that only the helper data have dropout and does not have the vertical stripe, all of the dropout luminance signals Y1, Y2, and Y3 are interpolated by the luminance signals Y0 in the same macro block.

Figure 8:
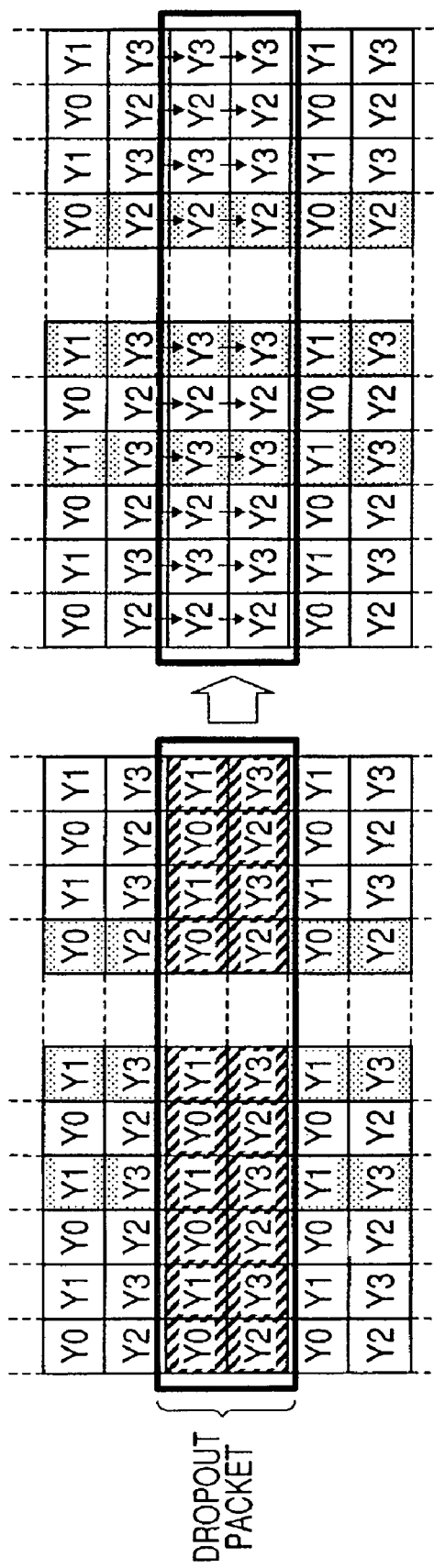
FIG. 8 is a diagram for explaining the interpolating process in the case where both of the base data and the helper data have dropout.

Also, FIG. 8 shows the interpolation processing in the case where both of the base data and the helper data have dropouts. As shown in FIG. 8, in the case where both of the base data and the helper data have dropouts, the dropout luminance signals Y0 to Y3 are interpolated by the luminance signals on the upper line.

As described above, according to this embodiment, the dropout of the base data and the helper data of the specific reproduction data is detected at the time of specific reproduction, independently. Then, the luminance signals of the base data and the helper data corresponding to the packet whose dropout has been detected are appropriately replaced with the luminance signals belonging to the same macro block and the luminance signals on the upper line, which are selected independently, on the basis of the type of specific reproduction data whose dropout has been detected (the type of dropout packet, in other words, base data or helper data) and the detection results of the vertical stripe.

As a result, even if the specific reproduction data has dropout, the base data and the helper data are subjected to the adaptive interpolation processing, independently, thereby making it possible to obtain the excellent and natural specific reproduction image whose asperity is not conspicuous.

In the above embodiment, the specific reproduction data processing unit 406 is equipped with the vertical stripe detection unit 423 to detect whether there is the vertical strip or not as the feature of the specific reproduction image, and the dropout specific reproduction data is interpolated according to the detection results. However, the present invention is not limited to this embodiment. For example, it is possible that the vertical stripe detection unit is replaced with a lateral stripe detection unit, the lateral strip detection unit detects whether there is a lateral strip or not as the feature of the specific reproduction image, and the dropout specific reproduction data is interpolated according to the detection result. Alternatively, it is possible that both of the vertical stripe detection unit and the lateral stripe detection unit are provided to interpolate the dropout specific reproduction data in the same manner. Likewise, in this case, it is possible to adaptively interpolate the dropout specific reproduction data according to the detection result.

OTHER EMBODIMENTS

Various devices operate in order to realize the functions of the above embodiment. To achieve this, a program code of software for realizing the functions of the embodiment is supplied to a computer within an apparatus or system that is connected to the various devices, and the various devices operate according to the program that is stored in the computer (CPU or MPU) within the system or device to implement the functions of the above-mentioned embodiment, which is also included in the scope of the present invention.

Also, in this case, the program code per se of the software realizes the functions of the above-mentioned embodiment, and the program code per se structures the present invention. Also, a means for supplying the program code to the computer, for example, a recording medium that stores the program code therein constitutes the present invention. As the recording medium that stores the program code therein, for example, there can be employed a flexible disk, a hard disk, an optical disk, a magneto optical disk, a CD-ROM, a magnetic tape, a nonvolatile memory card, or a ROM.

Also, it is needless to say that the following program code is included in the embodiment of the present invention. That is, not only the computer executes the supplied program code to realize the functions of the above embodiment, but also the program is associated with an operating system (OS) that operates in the computer or other application software to realize the functions of the embodiment.

In addition, it is needless to say that after the supplied program code is stored in a memory equipped in a function enhancement board of the computer or a function enhancement unit connected to the computer, a CPU or the like incorporated into the function enhancement board or the function enhancement unit executes a part or all of the actual processing, and realizes the functions of the embodiment by execution of the processing.

The above-mentioned embodiments merely show examples for carrying out the present invention, and the technical scope of the present invention should not be constructed restrictively by those embodiments. That is, the present invention can be implemented variously without deviating from the technical concept or the main features of the present invention.

This application claims priority from Japanese Patent Application No. 2005-192566 filed Jun. 30, 2005, which is hereby incorporated by reference herein.

What is claimed is:

1. A reproducing apparatus comprising:
   a reproducing unit which reproduces image data including a plurality of blocks each having a plurality of samples including a first sample and a second sample which are adjacent to each other in a horizontal direction, from a recording medium;
   an error detecting unit which detects an error in each of the first sample and the second sample included in the respective blocks of the image data reproduced by the reproducing unit;
   a discrimination unit which discriminates whether a difference between two samples adjacent to each other in the horizontal direction of the image data reproduced by the reproducing unit is greater than a predetermined value;
   an interpolation unit which interpolates the erroneous block detected in the image data reproduced by the reproducing unit in accordance with a discrimination result of the discrimination unit if the error detecting unit detects that the error occurs in the erroneous block in such a manner that an error occurs in the first sample included therein but no error occurs in the second sample included in the same block,
   the interpolation unit replaces both the first sample and the second sample of the erroneous block with samples of the block adjacent to the erroneous block in a vertical direction if the discrimination unit discriminates that the difference is greater than the predetermined value, and replaces the first sample of the erroneous block with the second sample of the same block if the discrimination unit discriminates that the difference is not greater than the predetermined value.

2. An apparatus according to claim 1, wherein each of the plurality of blocks included in the image data reproduced by the reproducing unit has a third sample adjacent to the first sample in the vertical direction and a fourth sample adjacent to the second sample in the vertical direction, and wherein the interpolation unit replaces both the first sample and the second sample of the erroneous block with the third sample and the fourth sample of the block which is adjacent upwardly to the erroneous block in the vertical direction if the discrimination unit discriminates that the difference is greater than the predetermined value.

3. A reproducing apparatus comprising:

a reproducing unit which reproduces image data including a plurality of blocks each having a plurality of samples including a first sample and a second sample which are adjacent to each other in a horizontal direction, a third sample adjacent to the first sample in the vertical direction and a fourth sample adjacent to the second sample in the vertical direction, from a recording medium;

an error detecting unit which detects an error in the samples included in the respective blocks of the image data reproduced by the reproducing unit;

a discrimination unit which discriminates whether a difference between two samples adjacent to each other in the horizontal direction of the image data reproduced by the reproducing unit is greater than a predetermined value;

an interpolation unit which interpolates the erroneous block detected in the image data reproduced by the reproducing unit in accordance with a discrimination result of the discrimination unit if the error detecting unit detects that the error occurs in the erroneous block in such a manner that errors occur in the second sample, the third sample and the fourth sample included thereon but no error occurs in the first sample included in the same block, the interpolation unit replaces the first sample, the second sample, the third sample and the fourth sample of the erroneous block with samples of a block adjacent to the erroneous block in a vertical direction if the discrimination unit discriminates that the difference is greater than the predetermined value, and replaces each of the second sample, third sample and the fourth sample of the erroneous block with the first sample of the same block if the discrimination unit discriminates that the difference is not greater than the predetermined value.

4. An apparatus according to claim 3, wherein the interpolation unit replaces the first sample, the second sample, the third sample and the fourth sample of the erroneous block with the third sample and the fourth sample of the block which is adjacent upwardly to the erroneous block in the vertical direction if the discrimination unit discriminates that the difference is greater than the predetermined value.

* * * * *